Dec. 25, 1934.    L. G. POOLER    1,985,690
TELEVISION SYSTEM
Filed March 6, 1931    2 Sheets-Sheet 1

INVENTOR
Louis G. Pooler
BY
ATTORNEY

Dec. 25, 1934.  L. G. POOLER  1,985,690
TELEVISION SYSTEM
Filed March 6, 1931  2 Sheets-Sheet 2

INVENTOR
Louis G. Pooler
BY
ATTORNEY

Patented Dec. 25, 1934

1,985,690

UNITED STATES PATENT OFFICE 1,985,690

TELEVISION SYSTEM

Louis G. Pooler, New York, N. Y., assignor to Communication Patents, Inc., New York, N. Y., a corporation of Delaware Application March 6, 1931, Serial No. 520,489

16 Claims. (Cl. 178—6)

This invention relates to electrical signaling systems, and particularly to the transmission of signals characterized by the light and shade densities of an object and the reception thereof in the form of visual images.

An object of the invention is to transmit the images of objects electrically for visual reproduction.

Another object of the invention is to transmit electrical currents characterized by the light and shade densities of an object, and to transform these signals into visual images representing said object with a system having no mechanically moving parts.

A further object of the invention is to explore an object in two dimensions with light from a circular arc, and to reproduce an image of said object produced by light from a similar arc.

It is well known in the art that an intense light may be produced by arcs having sufficient current, and that these arcs may be made to traverse a path within a magnetic field, the speed of movement of the arc being dependent upon the unidirectional component of the current in the arc and the strength of the field.

Certain paths for such electrical arcs may be in the form of a two dimensional screen, the arcs traversing this screen in a ladder-type manner or in the form of a spiral. By the expedient of a pinhole camera or its equivalent, such an arc may be made to scan in two dimensions or produce a two dimensional field of light on a point to point basis. When such a system is used in a receiving system, the incoming signal may be impressed upon the arc to weaken or strengthen its intensity for the production of light images.

The present invention contemplates the use of a simple arc of the circular type, that is, a band of light is produced between two electrodes, the electrodes being formed from either the core pieces of the field or of separate material. Because of the simple nature and formation of the electrodes, they can be made extremely sturdy and of a material and dimensions to have a high current carrying capacity. For instance, carbon electrodes may be used, with which the arc produced has an intensity sufficient for projection of light to long distances comparable to that used in motion picture projection systems. The arc travelling over this circular path is made to form a field of two dimensions by an arrangement of light deflectors which vary in direction from point to point around the arc and produce the two dimensional scanning effect. These deflectors may be composed of separate units or of a single annular ring such that if a thirty-six line picture is to be produced, then at every ten degree division of the deflector, a new angle of projection will occur. This angle over the ten degrees will vary in accordance with the position of the arc and the point to be illuminated. In other words, the deflector may be made to focus the arc upon a certain size screen at a certain distance, different deflectors of different angular variations being used for different length projections. This same principle is applicable at both the transmitter and receiver wherein the objects to be explored are at varying distances from the scanning system. Focussing lenses, preferably annular in shape, are employed to concentrate the light from the arc.

The invention will be better understood from the following description taken in conjunction with the accompanying drawings, in which:

Fig. 4 is a detail view of the analyzing reflector.

Figure 1:
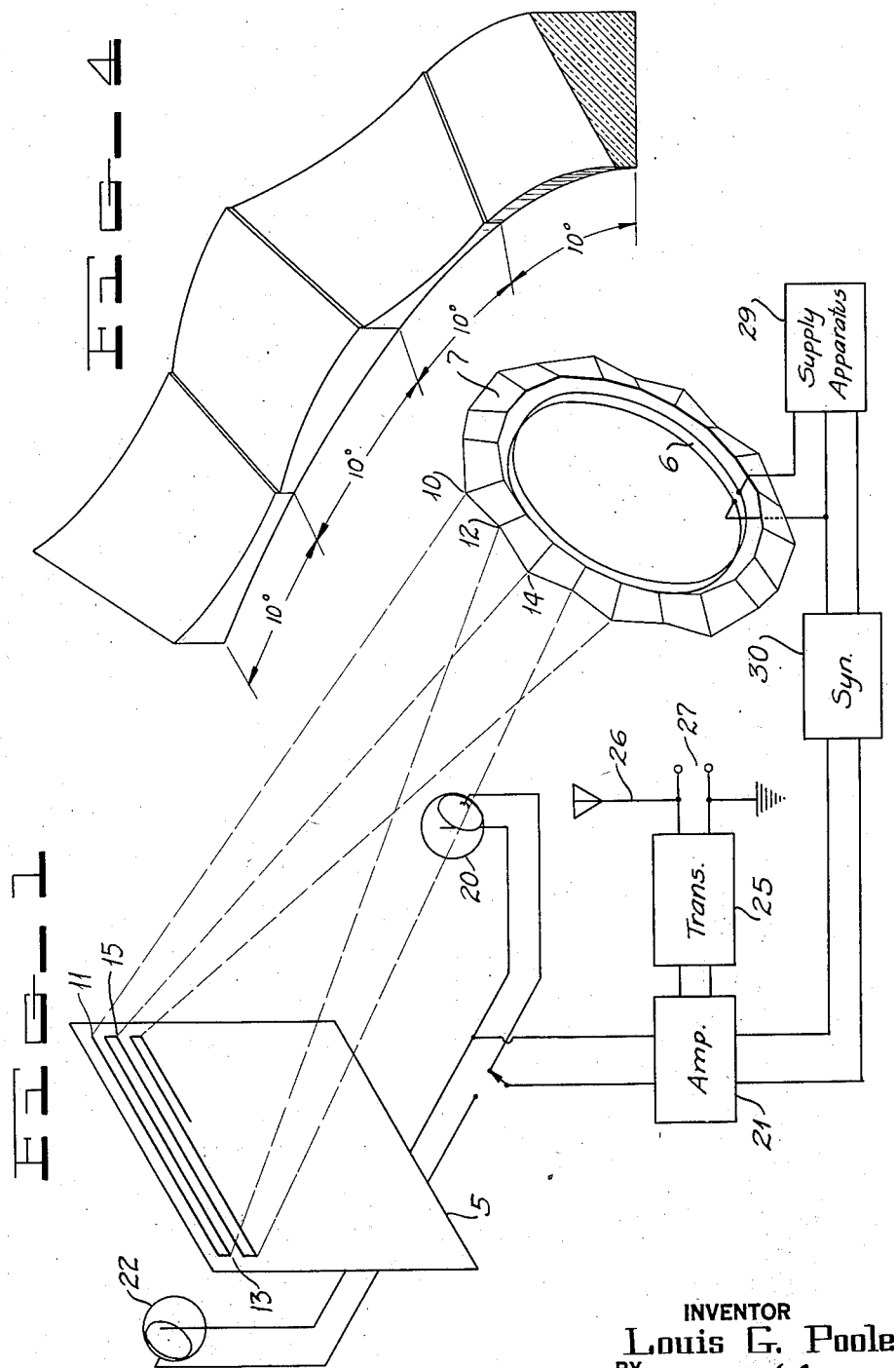
Fig. 1 is a diagrammatic view of the transmitter system.

Referring specifically to Fig. 1, a two dimensional screen 5 representing an object of any form, has projected thereon light from a circular arc 6. Conforming with the configuration of the arc path is a reflecting medium 7. This reflecting medium is preferably a silvered mirror or polished material which reflects a large proportion of the light incident thereon. Structurally it may be formed in individual units or molded in a solid piece with the reflecting surface having varying reflecting angles. For instance, incident light at the point 10 on the reflector 7 projects light to the object 5 at the point 11. As the arc moves over a certain portion of its path, for instance from the point 10 to the point 12, the ray projected will travel across the object 5 from the point 11 to the point 13. Similarly, for a travel of the arc between the points 12 and 14, the light therefrom will trace a path on the object 5 from point 13 to point 15. Similarly, for the remainder of the arc path, the light from the arc will be projected in a ladder pattern over the object. It is to be understood, of course, that other patterns such as a zig-zag or spiral may be taken by the light in accordance with the formation of the reflecting surface of the reflector 7.

The reflected light from the object 5 is detected by a photoelectric cell 20 and impressed upon an amplifier 21. The amplifier 21 may also be supplied from a photoelectric cell 22, this cell receiving transmitted light through the object 5 in case this object were a photographic film. The amplifier 21 feeds transmitting apparatus 25 which may be a modulator for broadcasting the signals over an antenna 26 or for transmission over a wire line 27 or an additional amplifier. Also shown in Fig. 1, is a supply system 29 and a synchronizer 30 for producing the scanning arc, the details of this apparatus being shown in the latter figures.

Figure 2:
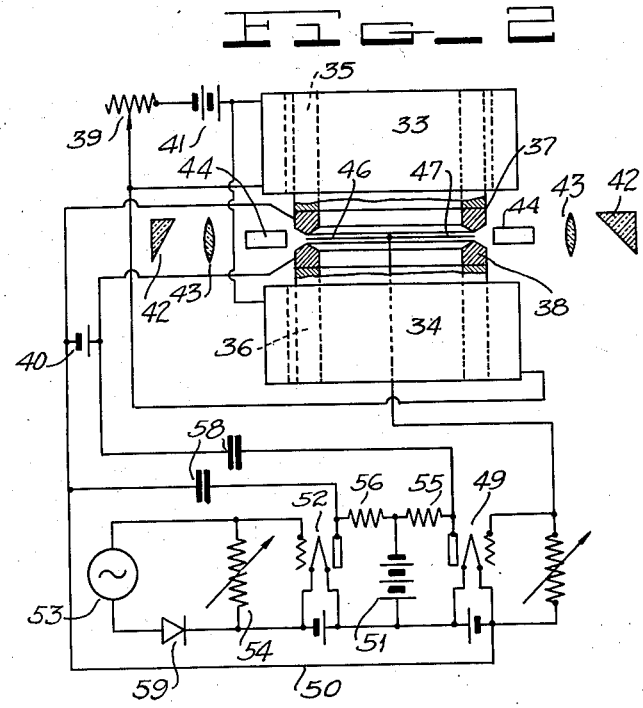
Fig. 2 is a detailed view of the arc system.

In Fig. 2, one modification of an arc rail system is illustrated. Two field coils 33 and 34 are wound upon cores 35 and 36, respectively, the cores having projections therefrom 37 and 38. These projections are slightly tapered at their nearest portions to obtain guiding surfaces between which the arc is formed. These electrode rails may be of the same material as the core and be extensions thereof or of separate protuberances and of other materials such as carbon. It has been found, however, that it is preferable to use metallic electrodes for these rails.

The field windings 33 and 34 are supplied from a direct current source 41 either in parallel as shown or in series, current control being obtained with a rheostat 39. These coils are so connected to the source 41 that adjacent poles are of like polarity, thereby producing at the arc path a radial flux which is normal to the arc in all positions. It is to be understood, however, that the core pieces may be of one piece or joined together, the arc rails being formed coaxially on a larger diameter than that of the core. With either construction, the field through which the arc passes is uniform. The electrodes 37 and 38 are supplied with a direct current potential from the source 40. An alternating current supply for both the field and the arc itself with the proper phase relation may be employed.

Shown in cross-section and concentrically with the electrodes and their driving field coils is a reflector system 42, the cross sections having different angles of reflection; an annular concentrating lens 43 and an annular light filter 44. This filter 44 is constructed similarly to a honeycomb with the exception that the width of the hollow section is comparable to the length of the arc while the thickness thereof is comparable to the width of the arc, forming a slit. The purpose of this structure is to confine the light to a path of projection which is the shortest distance between the arc and the reflector. The annular lens 43 concentrates the light from any particular slit to a point reducing the arc light image, which is rectangular in shape, to one which is either round or square when it falls on the reflector. The reflector 42 which is the reflector 7 of Fig. 1, is constructed to have a skew surface with a constant varying normal. The surface may be curved such as a parabolic reflecting surface, in order to aid in projecting the light in parallel rays, or may have a flat surface, the rays being made parallel before becoming incident thereon.

In Fig. 2 is also shown a circuit for maintaining a constant rotational speed. It has been found that speeds varying from two or three cycles per second to 100 cycles per second may be obtained with an arc of this type with splendid uniformity. However, due to extraneous variations in potential and the arc path, there occurs slight variations in speed within a cycle although the cyclic speed is maintained constant by the circuit to be described. Located at various intervals in the path of the arc are probes 46 and 47, which are connected to the grid of a vacuum tube 49. The remainder of the circuit of this connection is through one of the feed conductors from the source 40 and conductor 50. As the arc passes the probes, a voltage impulse is impressed upon the tube 49 which produces a current in its plate circuit from the source of potential 51. Connected in opposing relationship with the tube 49 is a similar tube 52 which is supplied with impulses from an oscillating system 53. These impulses are controlled as to the amplitude by a shunt resistance 54. The plates of the tubes 49 and 52 are supplied from the common source of potential 51 through resistances 55 and 56, respectively. Any differential between the impulses received from the arc probes 46 and 47 and the oscillator 53 is impressed upon the supply leads to the arc through the coupling capacities 58. Should the arc be not in step with the impulse frequency generated, a differential voltage will occur across the source 40 decreasing or increasing the total voltage supplied to the arc rails. The polarity of this voltage is in accordance with the lag or lead of the arc with respect to the constant impulse frequency produced by the oscillator 53, while the value thereof is determined by the amount of difference between the opposing impulses. In order to produce unidirectional impulses in the tube 52 a rectifier 59 is employed.

Figure 3:
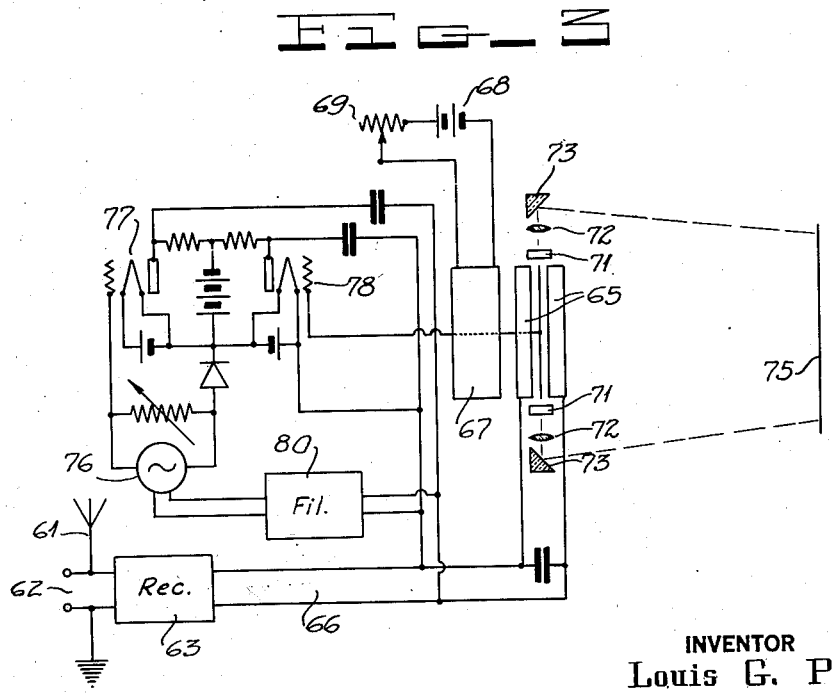
Fig. 3 is the conjugate receiving system.

Referring to Fig. 3, a receiving system with antenna 61, wire line 62, and amplifying apparatus 63 impresses the incoming signals on arc rails 65 over conductors 66. Signals which increase and decrease the a. c. component in the arc do not affect the speed but do effect its illumination. The signals impressed upon the arc rails are, of course, not demodulated and being at a high frequency such as the carrier frequency, increase the speed in one-half cycle by the same value as it is decreased during the next half cycle. As this reversal occurs in an extremely small fraction of time as well as over an extremely short distance of the arc path, no effective change in speed results. The arc rails are supplied with the driving flux from a field coil 67 provided from a source 68 controlled by rheostat 69. Light from the arc rails 65 is projected through the light director 71, concentrating lens 72 and reflector 73 to a receiving screen 75. The elements 71, 72 and 73 are shown in cross section for better illustration.

A synchronizing circuit has an impulse supply oscillator 76 and vacuum tubes 77 and 78. This system as far as local action is concerned operates in identically the same manner as the system described in connection with Fig. 2, and the description thereof may now be eliminated. To maintain synchronism, however, between the two arcs, the oscillator 76 is first adjusted to oscillate at the same frequency as the oscillator 53. By transmitting the impulses from the latter to the receiving oscillator 76, this oscillation will vary in frequency with the transmitting oscillator. This is the well known principle that two oscillators will pull in step when their frequencies have a small separation. A filter 80 permits only the synchronizing frequency to reach the oscillator 76.

In Fig. 4 a detailed view of a section of the annular reflector is illustrated. Three sections of this reflector are shown in which the curvature is varied in two directions for each section simultaneously, while each section has a specific curvature in accordance with the position it takes with respect to the arc. Each section is shown subtending an angle of 10° providing a thirty-six line scanning field. This reflector may be composed of sections and placed together as illustrated, or it may be molded from a single piece of material. The material may be polished metallic surface or a silvered mirror. It is to be observed that the slight abrupt changes between sections produce the separation between lines shown on the object 5. Of course, the object being scanned is to be well within the angle of projection.

It is to be understood that the light deflectors may be in the form of refractors such as prisms in which case, the honeycomb structure to obtain normal light is not required, the prisms cutting off all but light normal thereon.

It is also contemplated in the case of an arc which has linear sectional paths or in other words a polygonal surface, to have a deflector conforming in shape with the arc rails. Such a light deflector may be made of straight sectional portions with facility, the sections being fastened to a supporting plate. As mentioned above, for different projecting distances, various deflectors may be used having different focal lengths for the same arc system, the arc providing sufficient light for commercial projection.

What is claimed is:

1. In an electrical transmission system in which signalling currents characterized by the dark and light densities of an object are transmitted, an electrical discharge, a magnetic field in which said discharge occurs for propagating it in a hollow two-dimensional pattern, means associated with said discharge and utilizing the movement thereof for directing light therefrom in a solid two-dimensional pattern, and means for translating said light into said electrical currents for producing said signalling currents.

2. In an electrical transmission system, an electrical discharge, a magnetic field for propagating said discharge along a continuous ring-shaped path, means for concentrating light from said discharge, and means for directing said light in a ladder pattern to completely illuminate an object in unit areas, the movement of said discharge producing the scanning effect.

3. In an electrical transmission system, a magnetic field, electrode rails having a circular form positioned in said magnetic field, means for producing a moving electrical discharge across said rails, means for concentrating the light from said discharge, and means for projecting said light along an evenly distributed pattern having two dimensions as said discharge moves along said rails to produce unit area scanning of an object, the movement of said discharge producing the scanning effect.

4. In a television transmitter, a magnetic field, a pair of continuous electrode rails having a circular form located in said field, means for producing an electrical discharge between said rails, said discharge being propagated along said rails as a continuous band of light, and means conforming with the path of said electrode rails to direct said light over adjacent paths on an object as said discharge moves along said rails, the movement of said discharge producing the scanning effect.

5. In a television system, means for creating a moving light ray in a continuous path to form a hollow pattern, means utilizing the movement of said light for reflecting said light over parallel adjacent paths on an object, means for transforming light from said object into electrical variations corresponding with the light and shade intensities of said object, and means for reproducing at a receiving point an electrical image corresponding to the objects scanned.

6. In a television receiving system, a magnetic field, a pair of continuous electrode rails located in said field, an observing screen, means associated with said electrode rails for producing an electrical discharge therebetween said discharge forming a circular hollow pattern of light, means for projecting light from said discharge on said screen in a continuous pattern of two dimensions without retracing any of said field, said screen being shielded from direct light from said discharge, and means for impressing on said electrodes a modulated signal for reproduction on said screen.

7. In a television system, a field coil for producing a magnetic field, electrical rails located in said field across which an electrical discharge is produced, said discharge being propagated by said field in a continuous path over said electrodes to form a hollow pattern, and a stationary light deflector adjacent said discharge for deflecting light therefrom as said discharge moves along said rails, the movement of said discharge producing a unit area scanning effect.

8. In a television system, a field coil for producing a fringing field of flux, electrode rails located in the uniform portions of said flux field, means for producing an electrical discharge across said electrodes in such a manner that said discharge is perpendicular to the lines of said field flux, the movement of said discharge forming a circular hollow pattern, and stationary means immediately adjacent said discharge for directing light therefrom, the movement of said discharge producing a unit area scanning effect.

9. In a television transmission system, means for creating a fringing flux field, electrode rails located in portions of said flux field having the same strength, means for creating an arc between said electrode rails, means intermediate said electrodes in the path of said arc, a source of unidirectional current impulses, and electronic devices associated with said source of impulses and said last mentioned means for varying the potential on said electrodes in accordance with the variations in speed of said arc.

10. The method of maintaining a rotating electrical discharge at a uniform speed comprising creating from said discharge at definite points on its path of travel electrical impulses, generating independent impulses approximately timed with respect to the impulses created by said discharge, and combining said discharge impulses and said independent impulses to strengthen or weaken the discharge in accordance with the lag or lead of the discharge.

11. In a television system, a field coil, a pair of electrode rails in the field created by said coil, means for creating an electrical discharge to form a hollow enclosed area of light, said discharge being propagated along said electrode rails in accordance with the strength thereof, reflecting means adjacent said discharge for reflecting said light at a constantly varying angle, means for obtaining from said rotating arc a series of impulses timed in accordance with the speed of said arc, an independent source of impulses timed approximately with those created by said discharge, a second means for creating an electrical discharge at a receiving station, and means at said receiving station for impressing on said receiving discharge variations in light and shade intensities of an object scanned by said transmitting discharge.

12. In a system for the illumination of an object in unit areas, a moving source of light forming a continuous path enclosing an area, and means intermediate said light source and said object utilizing the movement of said light for directing the light from said source over said entire object in unit areas.

13. In a scanning system for television, means for forming a ring of light, said means including a moving point light source, and means utilizing the movement of said light source for directing the light therefrom in rays of unit area size to form a solid field of light within the persistency of vision.

14. The method of illuminating an object in unit areas from a moving light source which forms a continuous path of light enclosing an area comprising deflecting said light from sections of said path along adjacent paths to completely illuminate said object, the movement of said light source providing the time element of illumination whereby each section of the path of said source is definitely related to a corresponding section along said adjacent paths.

15. The method of scanning an object in unit areas with a moving light source which forms a ring of light, comprising deflecting a unit light ray from portions of the travel of said source rectilinearly along adjacent paths, the movement of said light source providing the scanning time element whereby each section of the path of said source is definitely related to a section along said adjacent paths.

16. In a television system, means for creating a moving light ray in a continuous path for enclosing an area, means for projecting said light ray on an object in unit areas, the size of a unit area being the size of said light ray and the movement of said light ray producing a scanning effect, and means for transforming light reflected from said object into electrical currents corresponding to the light and shade densities of said object.

LOUIS G. POOLER.